March 19, 1957  C. D. LOWE  2,785,587
DIFFERENTIAL TRANSMISSION
Filed March 28, 1955  2 Sheets-Sheet 1

INVENTOR.
Clifton D. Lowe
BY
Donald J. Harrington
Attorney

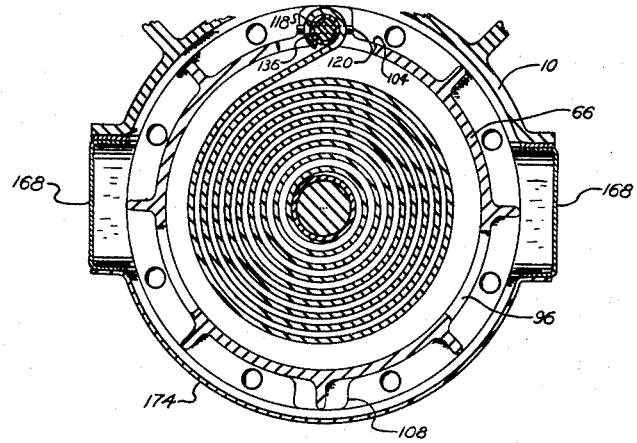

United States Patent Office 2,785,587
Patented Mar. 19, 1957

2,785,587

DIFFERENTIAL TRANSMISSION

Clifton D. Lowe, Livonia, Mich.

Application March 28, 1955, Serial No. 496,981

3 Claims. (Cl. 74—650)

My invention relates generally to power transmission mechanisms for wheeled vehicles and more particularly to a new and improved differential axle drive assembly for delivering vehicle driving power from an engine powered driving shaft to the vehicle driving wheels, said driving wheels being rotatably mounted about an axis which is perpendicular to the driving shaft.

It is customary in actual practice to power the axle shaft for the driving wheels of a vehicle by means of a differential assembly comprising a driving pinion and a mating differential ring gear which is secured to a cage, said cage providing a bearing support for a pair of intermediate pinions which are mounted upon a common axis. A two-part axle shaft is tranversely disposed with respect to the axis of the intermediate pinions and in concentric relationship with respect to the differential ring gear. An output gear is secured to the adjacent ends of each of the axle shaft parts and each output gear is in turn engaged with the two intermediate pinions.

One disadvantage in such a conventional differential construction resides in its inherent inability to transmit torque to either driving wheel when one driving wheel rests on a low friction surface, such as ice, even though the outer driving wheel may rest on a normal traction surface. I am aware of various types of complex differential drive mechanisms which have been introduced in the related art to compensate for this difficulty. However, none of these mechanisms have proven to be commercially successful by reason of their complex and expensive construction, because of their inferior performance characteristics and their inability to automatically distribute driving torque to each of the axle shaft components during turning maneuvers of the vehicle, or because of the low operating life of the large number of critical constituent elements.

I have successfully overcome the above-mentioned disadvantages of conventional differentials by providing a unique differential assembly of simplified construction which functions entirely automatically and which may be readily adapted for use with conventional automative vehicles at a relatively low cost.

The provision of a differential drive mechanism of the type generally described above being a principal object of my invention, it is another object of my invention to provide a differential assembly which provides a resilient connection between each component of a two-part axle shaft thereby cushioning any sudden driving torque variations.

It is a further object of my invention to provide a differential mechanism of the type referred to above which is capable of delivering driving power from a driving shaft to a perpendicularly disposed, two-part axle shaft and wherein means are included for permanently connecting the driving shaft with each of the axle shaft components to maintain an independent powered connection between each driving wheel and the source of driving power during operation of the vehicle under varying road conditions.

It is a further object of my instant invention to provide a differential assembly as set forth in the preceding object wherein each of the differential driving connections includes a resilient spring means which form a portion of the power delivery path.

It is a further object of my instant invention to provide a new and improved vehicle differential assembly of simplified construction which is characterized by a new and unique principle of operation and which may be readily adapted for use with conventional wheeled vehicles.

It is a further object of my invention to provide a differential assembly as set forth in the preceding objects wherein pilot means are included for centering each of the components of the two-part axle shaft.

It is a further object of my invention to provide a differential assembly as set forth in the preceding object wherein the pilot means is capable of accommodating axial floating movement of the axle shaft components.

Other objects and features of my instant invention will become readily apparent from the following description.

In carrying forth these and other objects of my instant invention, I have provided a differential housing which is adapted to rotatably carry a driving pinion, said driving pinion being drivably connected to the propeller shaft of a conventional vehicle power transmission. A circular drum is rotatably mounted within the housing and it carries a gear which drivably engages the above-mentioned driving pinion. One component of a two-part axle shaft extends concentrically from either end of the circular drum and a separate volute spring resiliently connects each axle shaft component with the circular drum.

The driving torque applied to the propeller shaft by the engine is transmitted to each of the axle shaft components through the associated volute springs, each spring forming a portion of an independent drive train for the separate driving wheels. In making a turn, the driving wheel closest to the center of curvature tends to slow down to a certain extent from its normal driving speed while the driving wheel farthest from the center of curvature tends to speed up from its normal driving speed. The volute spring associated with the inside driving wheel will therefore tend to wind up and become stressed while the other volute spring is correspondingly unwound, the amount of the windup of the one spring being approximately equal to the amount of relaxation of the other spring. Upon completion of the turn, the energy which is stored up in the one spring causes its associated driving wheel to "skid" with respect to the road surface until the stresses in the two volute springs become equalized.

Under normal driving conditions, the rolling contact of the driving wheels of a vehicle with the road surface during movement of the vehicle is constantly and intermittently interrupted by reason of the fact that each wheel becomes instantaneously separated from the road surface. It may be shown that this same condition exists at very low driving speeds as well as at high driving speeds. It is during such instantaneous periods when the driving wheels leave the road that the stressed volute spring causes relative movement of one wheel with respect to the other upon completing or during a turning maneuver. However it is emphasized that such an instantaneous interruption of the driving wheel traction is not absolutely necessary for satisfactory operation of my instant invention since I contemplate that each volute spring is capable of skidding its associated driving wheel whenever road conditions will permit regardless of whether or not the wheel leaves driving contact with the road surface. It is also emphasized that it is not essential that the stresses in each of the volute springs become equalized in every instance and hence it is not always required that one wheel skid upon the road surface. The differential assembly may operate satisfactorily even when the spring stresses are unbalanced following a turning maneuver. During normal operation of the vehicle, the vehicle is constantly engaged in turning maneuvers in either direction and also in slight deviations from a straight path during straight ahead driving. Therefore, the stress in each of the springs is constantly changing and it is therefore likely that the average stress for one spring will be substantially equal to the average stress for the other spring.

For the purpose of more particularly describing the new and advantageous features of the differential mechanism of my instant invention, reference will be made to the accompanying drawings wherein:

Figure 2 is a cross sectional view of the differential assembly of Figure 1 and is taken through one of the volute springs along section line 2—2 of Figure 1;

Figure 3 is a cross sectional view of the differential assembly of Figure 1 and is taken through the other of the volute springs along section line 3—3 of Figure 1;

Figure 5 is a modified construction of the axle shaft assembly which will permit an axial floating movement of the axle shaft components.

Figure 1:
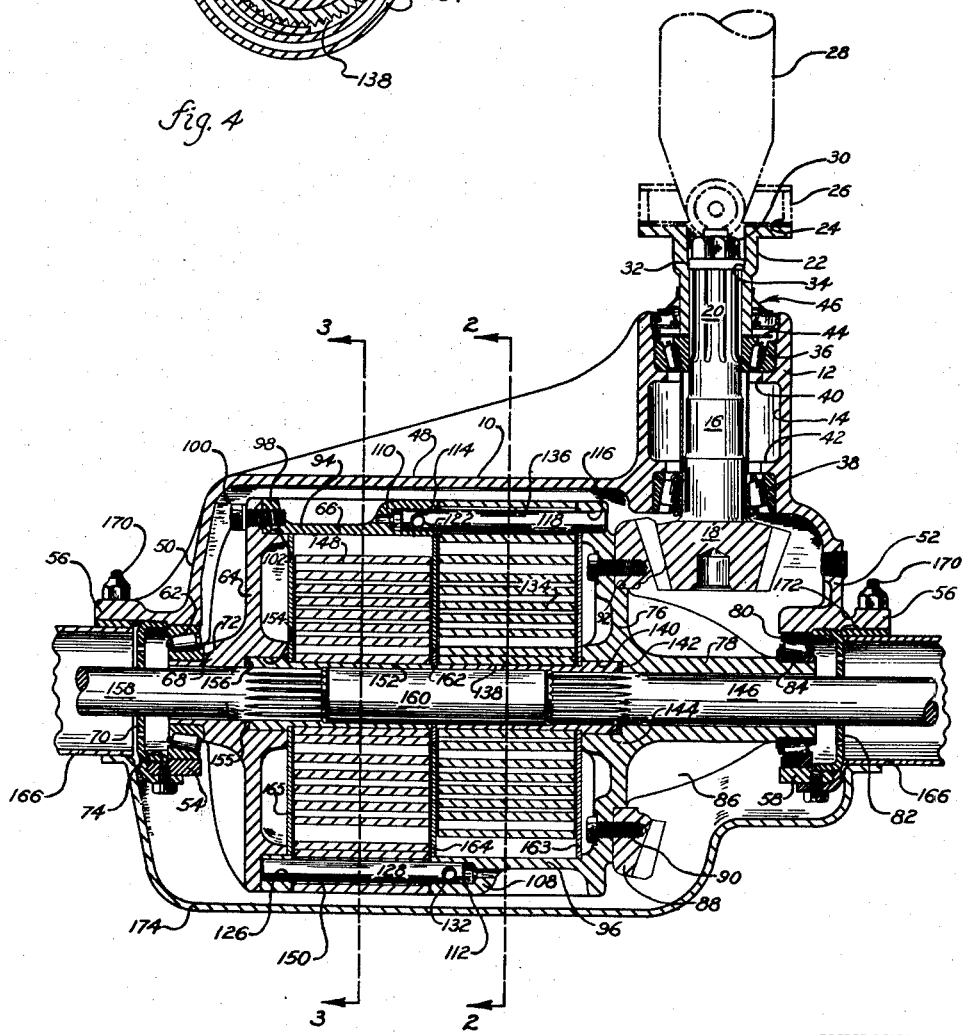
Figure 1 is a cross sectional view of the differential assembly of my instant invention showing a two-part axle shaft construction and a pair of volute springs associated with each axle part.

Referring first to Figure 1, the main casing of the differential assembly of my instant invention may be of cast construction and it is generally designated in Figure 1 by numeral 10. The casing 10 includes a forwardly extending extension 12 having a hollow interior 14 through which the shaft 16 of an input pinion element 18 is received. The shaft 16 is splined at its outermost end at 20 to an adaptor 22 having a radially extending flanged periphery 24, said periphery being adapted to be bolted to a universal joint coupling 26. A vehicle propeller shaft is schematically illustrated in Figure 1 at 28 and is positively connected to the adaptor 22 by means of the universal joint connection 26 in a conventional manner. The extreme end of the pinion shaft 16 is reduced in diameter and is threaded to receive a holding nut 30 and an adapter 32, the latter being adapted to engage an internal annular shoulder 34 in the hollow interior of the adaptor 22 for the purpose of preventing axial movement of the pinion 18 and the pinion shaft 16.

The shaft 16 is journalled at two spaced points within the interior of the extension 12 by means of tapered roller bearings 36 and 38, the outer races of each of said bearings being located by means of internal shoulders 40 and 42 respectively. A spacer element 44 may be positioned, as shown, between the inner race for the bearing element 36 and the axial end of the adaptor 22, and a suitable sealing structure 46 may be positioned about the adaptor 22 at the extremity of the extension 12.

The casing 10 further comprises a laterally disposed portion 48 and end wall portions 50 and 52. The wall portion 50 includes a circular eyelet 54, and an outer flange 56 surrounds the wall portion 50 and is integrally formed therewith. Similarly, the wall portion 52 is provided with an eyelet 58 and the outer flange 56 also surrounds wall portion 52 in the vicinity of eyelet 58. The eyelet 54 is adapted to receive a differential bearing 62 which rotatably journals a substantially circular end plate 64 of an internal drum structure generally designated by numeral 66, said end plate 64 being provided with a hub extension 68 received within the inner bearing race of the bearing element 62. A screw 70 is threadedly received within the eyelet 54 and is adapted to engage the outer bearing race of the bearing element 62 for the purpose of retaining the bearing element 62 in a predetermined axial position, the inner race of the bearing element 62 being adapted to axially engage an annular shoulder 72 formed on the end plate hub portion 68. A portion of the interior of the eyelet 54 is internally threaded, as shown at 74, to accommodate the externally threaded screw 70. The internal drum structure 66 is also partly defined by another end plate 76 at the opposite end of the lateral casing portion 48. The end plate 76 includes an extended hub 78 which is journalled within the eyelet 58 by means of another differential bearing 80, the latter being received within the eyelet 58 and retained therein by means of another screw 82. The screw 82 engages the outer race of the bearing element 80 and the inner race of the bearing element 80 engages a shoulder 84 formed at the end of the hub extension 78 of the end plate 76. For the purpose of adding rigidity to the end plate 76 and its integral hub 78, a plurality of webs 86 may be provided, as shown, said webs being cast integrally with the end plate 76 and the tub extension 78.

A ring gear 88 is secured to the outer side of the end wall 76 by means of bolts 90 and a suitable pilot or spacer shoulder 92 may be formed on the end plate 76 for properly positioning the ring gear 88 during assembly. By preference ring gear 88 is of the bevel gear type and is adapted to drivably engage the above-described differential pinion 18 to form a right angle drive between the internal drum structure 66 and the pinion shaft 16.

The drum structure 66 further comprises a pair of cylindrical portions 94 and 96 which are disposed in coaxial and juxtaposed relationship. The cylindrical portion 94 includes a radial flange 98 which may be bolted to the peripheral edge of the end plate 64 by means of bolts 100. A pilot shoulder 102 is formed on the inner side of the end plate 64 for the purpose of positioning the cylindrical portion 94 in proper concentric relationship with respect to the central axis of the end plate 64.

The cylindrical portion 96 is preferably formed integrally with the end plate 76 and, as best seen in Figure 2, it is provided with a peripheral opening shown at 104. The periphery of the cylindrical portion 96 is also provided with a built-up portion 108 at one location thereon at the end closest to the cylindrical portion 94. Similarly, the cylindrical portion 94 is built up at one portion 110 of its periphery at the end closest to the cylindrical portion 96. The built up peripheral portions 108 and 110 are provided with axially extending openings 112 and 114 respectively, the opening 114 being situated in axially adjacent relationship with respect to the above-described opening 104 in the periphery of the drum portion 96. The end plate 76 of the drum portion 96 is also provided with an opening shown at 116 which is axially aligned with the opening 114 formed in the drum portion 94. An anchor pin 118 is adapted to be received within the openings 114 and 116 in the drum portions 94 and 96 respectively, and a retainer pin 120 is adapted to be received through a transverse opening 122 formed in one end of the anchor pin 118 and in the built-up drum peripheral portion 114. As best seen in Figure 3, the drum portion 94 is similarly provided with a peripheral opening 124 and the drum end plate 64 is also provided with an opening 126, the opening 124 being situated in axially adjacent relationship with respect to the built-up peripheral drum portion 108 formed in the periphery of drum portion 96, and the openings 126 and 112 being axially aligned. Another anchor pin 128 bridges the opening 124 and it is received at either end thereof within the openings 126 and 112. A retainer pin 130 is transversely received through aligned openings 132 formed in one end of the anchor pin 128 and in the built-up peripheral drum portion 108.

Figure 4:
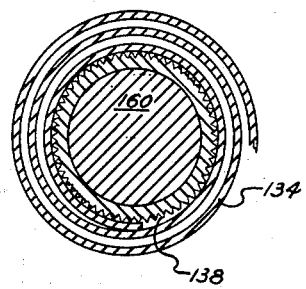
Figure 4 is an enlarged detail view showing the means for securing the innermost convolution of the volute springs to a centrally disposed sleeve which in turn is splined to one of the axle shaft components.

A first volute spring element 134 is positioned within the drum portion 96 and is comprised of a series of radially spaced convolutions, as shown. The outermost convolution extends through the peripheral opening 104 of the drum portion 96 and it encircles the anchor pin 118 thereby securing spring element 134 to the drum structure 66. By preference I have assembled a sleeve bushing 136 about the anchor pin 118 to provide a suitable support for this terminal end of the spring 134. The innermost convolution of the spring element 134 may be internally splined, as best seen in Figure 4, for the purpose of positively engaging an externally splined sleeve 138 which may be received through the innermost convolution as shown. By preference, the end of the spring element 134 may be welded to sleeve 138 to retain the innermost convolution in place. I also contemplate that the innermost convolution of each volute spring may be secured to its associated sleeve in some way other than by means of the above-described splined connection although such a splined connection is to be preferred. The sleeve 138 extends axially into a central opening 140 formed in the end plate 76. A suitable bushing 142 is interposed between the extended end of the sleeve 138 and an adjacent shoulder 144 on the end plate hub portion 78. The end of the sleeve 138 is internally splined to an externally splined axle shaft component 146, the latter extending axially to one side of the assembly through the center of the end plate hub portion 78.

The second volute spring element 148 is mounted within the cylindrical drum portion 94 and it is also comprised of a series of radially spaced convolutions, the outermost convolution of which extends through a peripheral opening 124 formed in the drum portion 94. The terminal end of the outermost convolution of spring 148 encircles the anchor pin 128 to provide a positive connection with the drum structure 66. By preference I have provided a sleeve 150 about the anchor pin 128 to provide a suitable bearing support for this terminal end of the outermost convolution. The innermost convolution of the spring element 148 is also internally splined to an externally splined sleeve 152, the latter extending axially to the left, as viewed in Figure 1, into a central opening 154 formed in the hub portion 68 of the drum end plate 64. The end of spring element 148 may also be welded to the sleeve 152 to permanently fix the innermost convolution in place. A suitable thrust washer 155 may be interposed between the axial end of the sleeve 152 and an adjacent shoulder 156 formed in the end plate hub structure 68. The sleeve 152 is internally splined at one end thereof to an externally splined axle shaft component 158 which extends from the differential assembly to one of the traction wheels of the vehicle. The opposite traction wheel of the vehicle is drivably connected to the extended end of the axle shaft component 146.

For the purpose of retaining the sleeve elements 138 and 152 in concentric relationship, I have provided a pilot shaft element 160 which may be slidably received within the adjacent ends of the juxtaposed sleeves 138 and 152. A suitable spacer washer 162 may be interposed between the adjacent ends of the aligned sleeves 138 and 152 and by preference a spacer plate or disc 164 is disposed about the washer element 162 between the adjacent convolutions of the springs 134 and 148. Other spacer discs 163 and 165 may be provided on the opposite sides of the springs 134 and 148, respectively, in axial engagement with the hubs of the adjacent end plates.

The axle shaft components 146 and 158 extend to either of oppositely mounted traction wheels through a suitable axle shaft housing, a portion of which is indicated in Figure 1 by numeral 166. This portion of the axle shaft housing defines a substantially circular enclosure for each of the axle shaft components 146 and 158 and it is integrally joined to a central axle shaft housing portion 168 which surrounds the previously described elements of the differential assembly. This central axle shaft housing portion 168 may best be seen in the cross sectional views in Figures 2 and 3. The differential casing 10 may be secured to the central axle shaft housing portion 168 by means of bolts 170 which extend through the previously described flange 56. By preference a spacer ring 172 is interposed between the flange 56 in one side of the central axle shaft housing portion 168.

The opposite side of the central axle shaft housing portion 168 is enclosed by a suitable cover plate 174, the latter being secured about its periphery 176 to the side of the housing portion 168 by suitable bolt means or the like.

In Figure 5 I have shown an alternate way of piloting the sleeves 138 and 152 secured to the adjacent inner ends of the axle shaft components 146 and 158. This alternate means comprises a pilot shaft 160' of reduced axial length so as to produce a clearance between each of its ends and the adjacent ends of the axle shaft components 146 and 148. This clearance will accommodate a limited floating movement of the axle shafts which in turn provides for a full floating axle construction.

During operation, power is delivered to the differential input pinion 18 from the vehicle power plant and the speed reduction transmission through the propeller shaft 28. The pinion 18 is adapted to rotate the drum structure 66 by reason of the positive engagement between the pinion 18 and the ring gear 88. The driving torque thus delivered to the drum structure 66 causes each of the volute springs 134 and 148 to wind up and to thereby transfer the driving torque to the sleeves 138 and 152 respectively, which in turn are drivably connected to their associated axle shaft components. If it is assumed that the vehicle is travelling in a forward direction and that the axle shaft component 146 is connected to the right hand traction wheel and that the left hand axle shaft 158 is connected to the left hand traction wheel, the torque which is delivered to each of the wheels will normally be equal since each of the springs 134 and 148 will be equally stressed. When the driver executes a right hand turning maneuver, the left hand driving wheel is caused to speed up a predetermined amount depending upon the radius of the turn while the right hand driving wheel tends to be reduced in speed by an amount equal to the amount of the aforementioned increase. The spring 148 will therefore tend to unwind from its normal driving position and the spring 134 will tend to become stressed and wound up more tightly. Upon the completion of the turning maneuver, the speed of the right hand driving wheel is again increased to normal and the speed of the left hand driving wheel is again decreased to normal. If it is assumed that each of the driving wheels remains in constant non-skidding contact with the road surface, the torque which is delivered to the right hand driving wheel following a right hand turn will be greater than the torque delivered to the left hand driving wheel because of the unequal distribution of the stresses in the volute springs 134 and 148. I contemplate, however, that the frictional contact between each of the driving wheels and the road surface will be intermittently interrupted and therefore the springs 134 and 148 will have ample opportunity to become adjusted to any given set of operating conditions even if it is assumed that the traction wheels do not leave contact with the road surface. During operation, the springs 134 and 148 are capable of skidding the traction wheels even under dry road conditions.

It will be apparent that if one traction wheel rests on a low friction surface such as ice or mud and that the other traction wheel rests on a road surface having a higher coefficient of friction, the torque delivered by the propeller shaft 28 will be principally distributed to the wheel having the most traction. This will adequately overcome the aforementioned shortcomings of conventional differential axle constructions.

In addition to the above, each of the separate driving connections between the shaft 28 and the wheels is cushioned by reason of the resilient volute spring associated therewith. This feature obviates the need for providing a separate spring cushioning means in the vehicle clutch mechanism.

Having described the principal features of my instant invention in accordance with the requirement of the patent statutes, what I claim and desire to secure by United States Letters Patent is:

1. A differential assembly for a wheeled vehicle comprising a driving member, a pair of coaxial axle shafts extending in opposed directions from said assembly, a vehicle driving wheel connected to each of said axle shafts at the extended ends thereof, said driving member comprising a casing encircling the adjacent ends of said shafts, and a pair of volute springs enclosed by said casing and comprising a series of radially spaced convolutions, the innermost convolution of each of said springs being connected to separate ones of said axle shafts and the outermost convolution of each of said springs being secured to said casing, each of said springs forming a portion of separate and independent power flow paths with the convolutions thereof being wound in the same direction about the common axis of said shafts, said springs accommodating the simultaneous delivery of power to each wheel.

2. A differential assembly for a wheeled vehicle comprising a driving member, a pair of coaxial axle shafts extending in opposed directions from said assembly, pilot means situated at the adjacent inner ends of said axle shafts for mounting said shafts in coaxial relationship, a vehicle driving wheel connected to each of said axle shafts at the extended ends thereof, said driving member including a casing encircling the axes of said axle shafts, and a pair of volute springs enclosed by said casing and comprising a plurality of radially spaced convolutions, each of said springs being secured at the outer end thereof to said casing and at the inner end thereof to a separate one of said axle shafts, each of said springs forming a portion of separate and independent paths extending from said driving member to said vehicle driving wheels for simultaneous delivery of power to each of the latter.

3. The combination as set forth in claim 2 wherein said pilot means includes separate sleeves encircling the adjacent inner ends of each of said axle shafts and a spacer element disposed within said sleeves in aligned and juxtaposed relationship with respect to each of said inner ends.

References Cited in the file of this patent

UNITED STATES PATENTS

| 1,285,017 | Brush | Nov. 19, 1918 |
| 1,414,126 | Harris | Apr. 25, 1922 |
| 2,618,137 | White | Nov. 18, 1952 |

FOREIGN PATENTS

| 107,727 | Austria | Oct. 25, 1927 |